United States Patent
Dimond

(10) Patent No.: US 8,589,600 B2
(45) Date of Patent: Nov. 19, 2013

(54) METHOD OF TRANSFERRING DATA WITH OFFSETS

(75) Inventor: Robert Gwilym Dimond, London (GB)

(73) Assignee: Maxeler Technologies, Ltd., London (GB)

(*) Notice: Subject to any disclaimer, the term of this patent is extended or adjusted under 35 U.S.C. 154(b) by 193 days.

(21) Appl. No.: 12/636,906

(22) Filed: Dec. 14, 2009

(65) Prior Publication Data

US 2011/0145447 A1    Jun. 16, 2011

(51) Int. Cl.
*G06F 13/28* (2006.01)

(52) U.S. Cl.
USPC .................................. 710/22; 380/279

(58) Field of Classification Search
USPC ........................................... 710/22
See application file for complete search history.

(56) References Cited

U.S. PATENT DOCUMENTS

| | | | |
|---|---|---|---|
| 5,410,309 A * | 4/1995 | Jedwab et al. | 341/95 |
| 5,894,560 A | 4/1999 | Carmichael | |
| 6,006,287 A * | 12/1999 | Wakazu | 710/22 |
| 6,606,287 B2 * | 8/2003 | Korfin et al. | 369/47.28 |
| 7,363,552 B2 * | 4/2008 | Huang et al. | 714/702 |
| 7,430,621 B2 * | 9/2008 | Wang et al. | 710/22 |
| 2008/0186052 A1 * | 8/2008 | Needham et al. | 326/38 |
| 2011/0078342 A1 * | 3/2011 | Siddabathuni et al. | 710/22 |

* cited by examiner

*Primary Examiner* — Elias Mamo
(74) *Attorney, Agent, or Firm* — Conley Rose, P.C.

(57) ABSTRACT

The invention provides a method of transferring data from a data array within a main memory of a computer to an accelerator for processing, the embodiment of the method comprising: at the accelerator, requesting data from the main memory and generating a data stream between the main memory and the accelerator, the generated data stream including data from the data array; and, using an offset to determine the scheduling of array elements within the generated data stream.

14 Claims, 5 Drawing Sheets

Paged memory system. Shaded region is the user array.

1. Accelerator data reaches Milestone 1

2. Accelerator data reaches Milestone 2

METHOD OF TRANSFERRING DATA WITH
OFFSETS

FIELD OF INVENTION

The invention relates to a method of transferring data from a main memory of a computer to an accelerator for processing, a method of processing data using an accelerator, a method of processing a data-set on a computer, an accelerator for connection to a main computer, a computer system and a computer program.

In embodiments, the invention relates to a technical method and apparatus that can be used to solve numerical problems over a large data-set on a bus-connected accelerator.

BACKGROUND

In many current applications data-sets of significant size are generated and need to be processed. For example, in oil and gas exploration where mapping of a surface such as an ocean floor is required, typically a grid of sensors, distributed over a very large area, might be used to collect data to help in the search for hydrocarbon reserves. A sonic impulse is provided and each of the sensors serves to measure reflection from the surface or sub-surface being mapped. This might include measuring, at each sensor, the frequency, amplitude and delay of the received signals. Ocean based surveys typically use 30,000 sensors to record data over a 120 dB range each being sampled at more than 2 kbps, with new sonic impulses every 10 seconds. The volume of data generated with such a system is significant, typically of the order of terabytes of data each day. Similar sized (or larger) data-sets might be generated in other applications too where a physical process is modelled. For example in areas such as fluid flow modelling or financial data modelling the size of the data-set can be very large indeed.

Accelerators are known for use with computers to enable them to process such data-sets. An example of a known accelerator is the Maxeler MAX2 PCI Express Card. Typically an accelerator includes a field-programmable gate array (FPGA), designed to be configured by the customer or designer after manufacture. The FPGA configuration is generally specified using a hardware description language (HDL), and it is known that such devices can be used to implement any logical function that an ASIC could perform.

Conventionally, in use, whilst processing such a data-set, a substantial portion of the data-set is transferred to and from the accelerator on each iteration. Numerical solutions typically involve many such iterations. A typical data-set size approaches the maximum memory capacity of current state-of-the-art computers.

The accelerator computes an iteration by streaming data from the data-set through a compute pipeline. In some cases it might be that part of the compute operation is performed by the processor of the computer and not by the accelerator. In the example of a 3D convolution operation, the boundary conditions and/or special encoding or decoding of the data-set may be performed by the computer's own processor whilst the majority of the computation required to complete the convolution calculation is performed on the accelerator.

SUMMARY

FIG. 1 shows a simplified schematic representation of a computer system 2. A main computer 1 is provided. Many components of the main computer 1 are not shown for simplicity, but it will be understood that all features of a conventional computer system might be included. The computer 1 includes a central processing unit CPU 4 connected to a main computer memory 6 via a bus 8. In addition, the computer system 2 includes an accelerator 10 which typically includes an FPGA. Such a system might be used for solving numerical problems and may be defined as a bus-connected accelerator. The accelerator operates on a data-set in main memory via a DMA (Direct Memory Access) engine 16. The accelerator 10 includes a compute pipeline 12 that contains buffering 14 to organise the required data items for a compute operation. The accelerator might be a separate component connected via an external bus to the main computer 1 or might be a chip or card inserted as part of the main computer.

Although in theory such devices are known and work acceptably, as data rates increase and the size of data-sets on which operations are performed also increase, improvements are desired.

One particular problem arises where there is a need to maximise the rate of data transfer over the bus (thereby to minimise the data-set transfer time between the computer and the accelerator) and also where there is a desire to minimise the complexity of the accelerator hardware dedicated to data transfer. As large data sets are often transferred over the bus in each iteration some means by which the amount of data transferred in each iteration can be limited, without compromising functionality is desired.

The desire to minimise the complexity of the accelerator hardware dedicated to data transfer is particularly important where the data transfer hardware contends for the same resource(s) as the compute hardware of the accelerator. The FPGA typically contains three types of resources: LUTs (look up tables), registers and Block RAM. Data transfer hardware and compute hardware both contend for these same three resources.

The problem arises in particular where the computation to be executed by the accelerator involves more than one data array from software. Operating on different elements from the same array requires buffering of a set length 'N' so that while element A[0] is on the output of the buffer A[N] is at the input to the buffer.

With multiple data arrays interleaved, all arrays must be buffered by the same amount to line up the correct elements. Buffering is a limited resource on-chip, i.e. on the accelerator chip, and thus limits the maximum problem size the accelerator is able to deal with and the number of parallel compute pipelines. FIG. 2 shows schematically part of an accelerator and in particular the compute process thereof. The compute process includes a DMA engine 16 arranged to receive data from two sources, data arrays Data A 18 and Data B 20. In this particular example, the pipeline is arranged to execute the calculation

B[0]*(A[0]+A[N]*2+A[N+M]*3)

where N and M are the buffer lengths.

Thus, the array Data B 20 needs to be delayed by N+M buffers (shown shaded) to line up the data items as the first calculation to be performed requires values for B[0] and A[N+M] (also A[0] and A[N]). The array Data B 20 must be delayed even if the computation does not need access to previous elements of array Data B 20 and hence the buffering is wasted. This is because the calculation cannot start with element B[0] until the accelerator has in its buffers the value of the element A[N+M]. Data from, in this case, both arrays are transferred over the bus to the accelerator causing significant use of the limited bus resource.

There are known accelerators. U.S. Pat. No. 6,006,287 discloses use of interleaved multiple streams using a single DMA controller to remove the overhead of interleaving streams in software when using a single DMA engine. U.S. Pat. No. 5,894,560 discloses the use of interleaved multiple DMA channels using a single controller for favourable cost/performance using multiple IO devices with a single controller.

According to a first aspect of embodiments of the invention, there is provided a method of transferring data from a data array within a main memory of a computer to an accelerator for processing, the method comprising; at the accelerator, requesting data from the main memory and generating a data stream between the main memory and the accelerator, the generated data stream including data from the data array; and, using an offset to determine the scheduling of array elements within the generated data stream.

The invention in an embodiment provides a method of DMA data transfer between a main computer and an accelerator in which the accelerator is arranged to generate a data stream including data obtained by the DMA operation from the main memory. The use of offsets to determine the scheduling of array elements in the generated data stream means that the accelerator does not need to include the same buffers for storage of data that would previously have been required to perform certain types of operation. In the specific non-limiting case of a convolution between two data arrays stored in a computer main memory to which, in use, the accelerator might be connected, the accelerator does not include buffers for storing values from the data-sets. Rather the accelerator includes offsetting capability so that the data does not need to be stored in sequence in buffers in the accelerator but instead it is able to access data in the memory and provide it at the offset position within the generated data stream. In other words, instead of simply taking data from the front of the main memory data queues when the accelerator computation first starts, and then having to store it in buffers and/or send padding bytes over the bus, the accelerator is arranged to use offsets within the generated stream to ensure that data is sent to the accelerator just as it is required. It will be appreciated that the term "array elements" refers to units of data that might be transferred into the generated data stream on its way to the accelerator from the one or more data arrays. The array elements may be single bytes of data or pages of data from the array, or indeed any other appropriate unit or amount of data.

In an embodiment, where multiple arrays are interleaved for the purpose of DMA transfer using a single channel, the offset of an array is the position in the interleaved data of the first page of that array. The need for buffering the array on the accelerator is thus obviated whilst enabling the transfer to start at any desired position within the stored array. The use of the bus is reduced by the use of an offset since the transmission of padding data bytes over the bus is obviated.

It is generally desired to minimise the software overhead of data transfer between the CPU and the accelerator. This is the same as the consideration related to the need to maximise the rate of data transfer over the bus discussed above where software overhead is the bottleneck for data transfer. However, it includes the desire to free CPU resource for other compute operations. In addition, it is desirable to minimise the total compute time for an iteration, including data transfer time and accelerator compute time.

Setting up the DMA operation incurs some software overhead. During this set-up operation, the DMA engine and accelerator 10 are idle. In cases where the computation occurs by repeated DMA of data through the accelerator, the set-up software overhead is critical to the entire computation. Thus, as the performance of the accelerator increases, the set-up time becomes a significant bottleneck to the speedup and operation of the accelerator. This can be understood by reference to FIG. 3, which shows schematically the duration of each compute iteration as performed by the accelerator. For each compute iteration it is necessary to transfer the data-set to and from the accelerator. Setting up the transfer takes some software set-up. The iteration time is the sum of the software set-up and transfer time.

According to a second aspect of embodiments of the invention, there is provided a method of processing data using an accelerator arranged to receive data from a main memory and execute an operation on the data to process it, the method comprising; requesting a data transfer from the main memory to the accelerator; upon receipt of the data transfer request at the accelerator generating and storing a list of the memory locations of requested data; and upon receipt of a subsequent data transfer request accessing the stored list and, if the corresponding location is already present in the list, commencing the DMA transfer without generating a new list of memory locations.

The stored list can be provided locally, i.e. on the accelerator, or alternatively as part of the main memory.

In an alternative, a stored list is not used. Rather, the user explicitly re-sends data from the same array and re-cycles the scatter/gather list.

A further problem arises where it is desired to minimise the total compute time for iteration, including data transfer time, accelerator compute time and CPU compute time. There are situations in which a compute operation will require, as well as operation of the accelerator, operation of the host or main computer 1 CPU 4. A problem thus arises when the CPU 4 performs some of the computation for an iteration and that computation is dependent upon data from the accelerator. The CPU compute is dependent upon output data from the accelerator and the input data for the next iteration on the accelerator is dependent upon the CPU compute. As performance of the accelerator increases, the CPU time becomes a significant bottleneck to the speedup of the accelerator.

FIG. 4 shows a schematic representation of the duration of each compute iteration as performed by the accelerator and the CPU of the host system. Each compute iteration transfers the data-set to and from the accelerator. Controlling and setting up the transfer takes some software set-up. The iteration time is the sum of the software set-up, the transfer time and the CPU compute time. An example of such a situation is a 3 dimensional convolution. The computation of boundary elements is extremely complex and would usually be done by the main CPU and not the logic (e.g. FPGA) of the accelerator. In practice, due to the complexity and speed of operation of the processor, this part of the process can take as long as the entire accelerator computation process, generating a factor of 2 increase in the whole operation time.

According to a third aspect of embodiments of the invention, there is provided a method of processing a data-set on a computer having a central processing unit for processing data, using an accelerator coupled to the computer, the accelerator including a programmable logic device for processing the data-set, the method comprising: processing in parallel data of the data-set on the main computer CPU and the accelerator.

Accordingly, in contrast to known system where there is a strict series relationship between the operation of an accelerator and the CPU with the processing of a data-set, in the present method, processing of the data-set between the main computer CPU and the accelerator is performed in parallel such that the overall time for processing the data can be comparatively reduced.

The reason for computing the boundary elements on the CPU is their complexity. The reason that the boundary computation on CPU can take as long as the accelerator (even though there is much less data) is due to the fact that the CPU is typically 100 to 200 times slower than the accelerator. In a 3D convolution example, a typical mesh size is 1000×1000× 1000 ($10^9$ points). There are 1000×1000×6 boundary points corresponding to the 6 faces of the cube, so computation of these points corresponds to a little over half a percent of the total amount of computation.

The CPU computes about 0.5% ($6 \times 10^6/10^9$) of the points at approx 0.5% of the speed, and so takes as long as the accelerator per time-step.

Preferably, the method according to the third aspect comprises setting a marker in the data set such that upon reaching the marker the central processing unit of the main computer is activated to process data.

In one non-limiting example, the processing comprises the execution of a 3 dimensional convolution, in which the boundary conditions of the convolution are performed by the central processing unit of the main computer. Whereas conventionally doing such an operation using an accelerator it would have been necessary to perform all the processing of the non-boundary region and then once this had been done, then do all the boundary regions, using the present method the boundary regions can be computed at stages in parallel during the computation of the non-boundary regions such that he overall process time is reduced.

Preferably, one or more markers or milestones are set when an edge of the volume being convolved is reached.

In all of the first three aspects of embodiments of the invention methods are provided for increasing the efficiency and/or speed of operation of, or data transfer to or from, an accelerator for use with a computer system having a main memory.

According to a fourth aspect of embodiments of the invention, there is provided a computer program, optionally stored on a computer readable medium, which when run on a programmable logic device provided on an accelerator causes the accelerator to execute the method of any of the first to third aspect of the invention.

According to a fifth aspect of embodiments of the invention, there is an accelerator for connection to a main computer having a central processing unit and main computer memory including at least one data array, the accelerator including logic to execute a computation process and being arranged to generate a data stream including data from the data array within the main memory, the accelerator comprising: a logic device arranged to be programmed to execute a desired computation process; and a device driver arranged to control the request of data from a main memory of a computer to which, in use, the accelerator is connected, the driver being arranged to do one or more of the following: (a) using an offset to determine the scheduling of array elements within the generated data stream; (b) upon receipt of the DMA data transfer request at the accelerator generating in the accelerator a list of the memory locations of requested data; copying the list to a stored list; and upon subsequent DMA data transfer request accessing the stored list and, if the corresponding location is already present, commencing the DMA transfer without generating a new list of memory locations; and, (c) set a marker in the compute pipeline of the accelerator such that upon reaching the marker the central processing unit of the main computer is activated to process data returning from the accelerator.

According to a sixth aspect of embodiments of the invention, there is provided a computer or computer system arranged to perform the method of any of the first to third aspects of the invention. In one aspect, there is provided a computer system, including: a computer having main memory and a central processing unit; and an accelerator according to the fifth aspect of the invention.

Any of the features provided by the dependent claims may be provided in combination with any one or more other of such features together with the features of one or more of the independent claims.

BRIEF DESCRIPTION OF THE DRAWINGS

Embodiments of the invention will now be described by way of example with reference to the accompanying drawings, in which.

DETAILED DESCRIPTION

Figure 1:
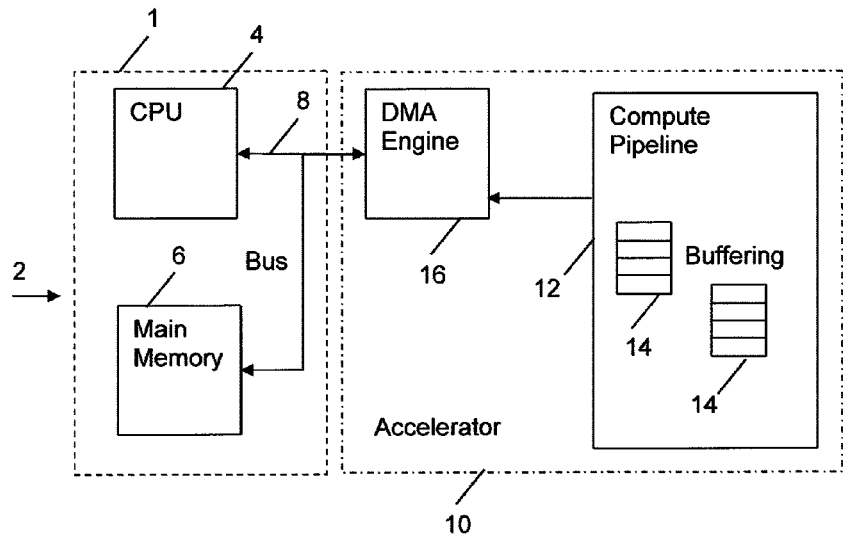
FIG. 1 shows a schematic representation of a computer system.
Figure 5:
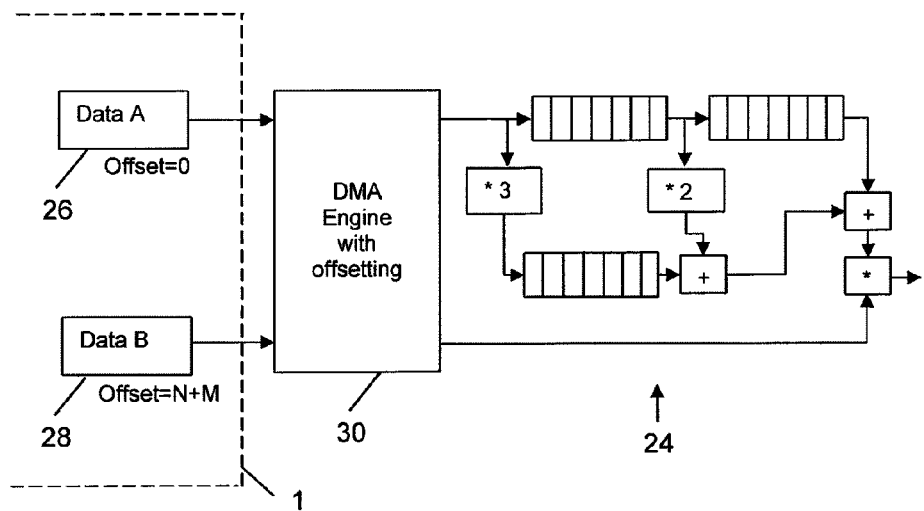
FIG. 5 shows schematically part of an accelerator and in particular the compute process thereof.

FIG. 5 shows schematically part of an accelerator and in particular the compute process thereof. The accelerator 24, like the accelerator shown in and described above with reference to FIG. 2, is arranged perform a convolution of two data-sets, Data A 26 and Data B 28 from within memory (not shown) on a main computer 1. The accelerator 24 includes a DMA engine 30 to control data flow between the accelerator 24 and the data sources Data A 26 and Data B 28 which might be the memory of a host system (not shown in detail). It will be appreciated that the data transfer between the main computer 1 and the accelerator 24 will typically be via a data bus on the main computer as shown in FIG. 1.

Figure 2:
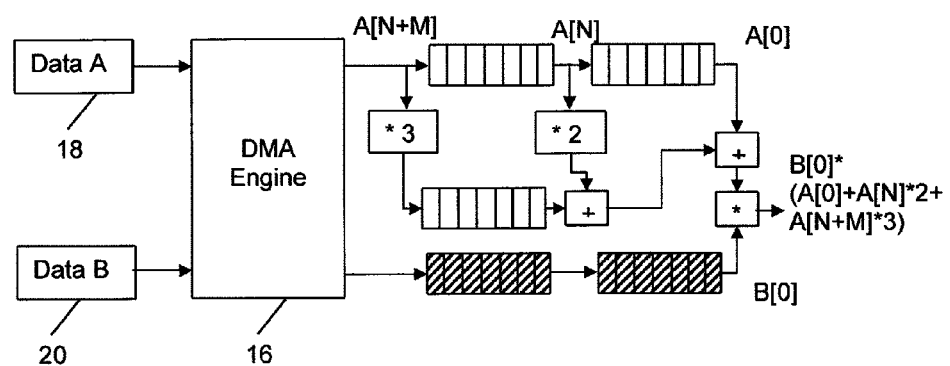
FIG. 2 shows schematically part of an accelerator and in particular the compute process thereof.
Figure 3:
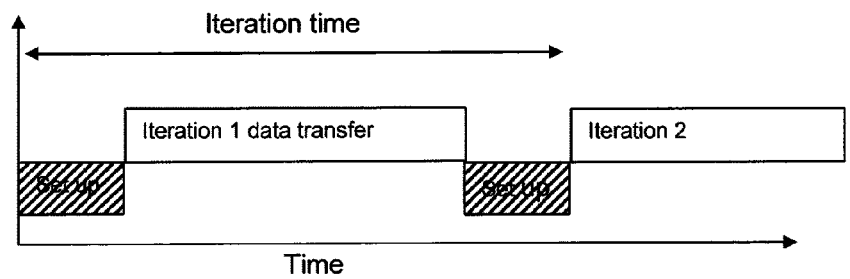
FIG. 3 shows schematically the duration of a compute iteration as performed by an accelerator system.
Figure 4:
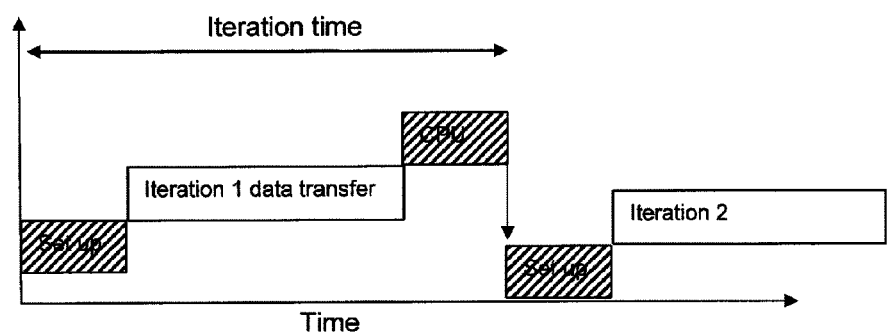
FIG. 4 shows a simplified view of a schematic representation of the duration of each compute iteration as performed by the accelerator and the CPU of the host system.

In contrast to the example of FIG. 2, in this case the accelerator does not include buffers for storing values from the data-set B. Rather the DMA engine 30 includes offsetting capability so that data from the data-set B does not need to be stored in sequence in buffers in the accelerator. Instead, the DMA engine is able to access data from the host memory and, using the offsets, provide this into the generated data stream at a required position. Instead of simply taking data from the front of the queues 26 and 28 when the accelerator computation first starts, the DMA engine is arranged to use offsets within the generated data stream. This means that it is not necessary to transmit padding bytes over the bus as it would have been previously. It will be appreciated that in FIG. 5 the generation of a data stream e.g. an interleaved data stream, is not shown explicitly. The generation of a data stream is explained in detail below with reference to FIG. 8.

In known systems, the compute pipeline contains buffers to line up data items from different data arrays (streams). Buffering is essential to look ahead in the stream to compute with data items at different offsets. Such a need arises where a convolution is performed for example.

In an example of the present system, as will be described in detail below with reference to FIG. 8, the accelerator functions by generating a data stream. Where more than one array is to be processed, the generated data stream is interleaved. The generated stream is made up of component streams and each component stream has an offset set in the device driver. The device driver schedules DMA so that the transfer of each array starts after the offset. One component stream has an offset of zero to start the overall transfer. The DMA engine transfers data according to the schedule and inserts dummy data (typically zeros) to pad the data up to the offset. There is no transfer of dummy or "padding" data over the bus.

Thus, in effect, the buffers for Data Array B are pushed from the accelerator memory to main memory. Accelerator memory is costly whereas main memory is already used to store the array. Referring again to FIG. 5, the accelerator is set-up to perform the function $$B[0]*(A[0]+A[N]*2+A[N+M]*3)$$

Previously N and M were the buffer lengths necessary to store the values for the B array that are necessary to perform the compute. This is because the first value to be output from the accelerator requires as inputs both the values B[0] and A[N+M] (and also A[N] and A[0]). In other words even though, as far as the B factor is concerned the computation can start as soon as the first entry is received from the host memory, it must wait until all values for A up to A[N+M] are stored in the accelerator until it can start to compute. Conventionally, plural dummy bytes would have been transmitted over the bus so that within the generated stream, there was some data to fill the slots corresponding to the padded component stream. Thus, memory is used in the accelerator for storing values of B that are not actually needed for the first calculations. The value of B[N+M] would not in fact be needed until the value A[2(N+M)] is used by the accelerator. The use of offsets within the DMA driver addresses this problem since convolution can start on the first cycle as soon as A[N+M] is available and no buffering is needed for the values of B. The dummy data that may well still be needed in the accelerator compute pipeline is generated on board the accelerator and so its transmission does not utilise the scarce resource of the system bus.

The scheduling of data, the DMA operation, the use of component streams and the formation of the generated data stream will be described in greater detail below with reference to FIG. 8. It will be understood that technical advance as described with reference to FIG. 5 is the use of one or more offsets to reduce the memory requirements of an accelerator and to reduce the pressure or competition for resource on the bus connecting the accelerator and the main computer.

As explained above, it is generally desired to minimise the software overhead of data transfer between the CPU and the accelerator and also to minimise the total compute time for an iteration, including data transfer time, accelerator compute time and, where appropriate, CPU compute time.

As is well known, Direct Memory Access (DMA) allows certain hardware subsystems within a computer to access system memory for reading and/or writing independently of the central processing unit. "Scatter/gather" DMA allows the transfer of data to and from multiple memory areas in a single DMA transaction and may be thought of as the connecting together of multiple simple DMA requests. Scatter/gather DMA allows the transfer in a single operation of data to/from user memory areas that are non-contiguous in physical memory due to virtual memory paging. Setting up the DMA operation incurs some software overhead. During this set-up operation, the DMA engine and accelerator 10 are idle.

Figures 6A, 6B:
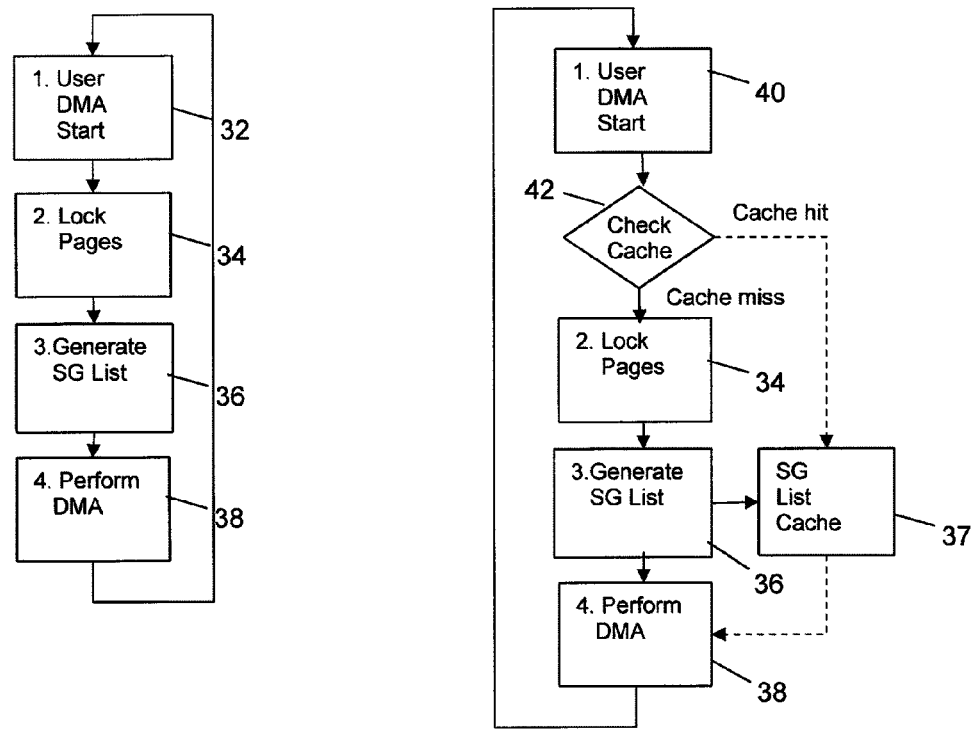
FIGS. 6A and 6B show the steps in a scatter gather process.

In known systems, each scatter/gather DMA operation requires software overhead to lock pages in physical memory and generate a scatter/gather list. FIG. 6A shows a schematic representation of such a system. As can be seen, at step 32 a user starts a DMA process by generating a DMA request. Next, at step 34, the pages of main memory that include the addresses to be accessed in the DMA operation are locked. At step 36, a scatter/gather list is generated. The scatter gather list includes in it the pointers to and sizes of data that are to be transferred. Finally, at step 38, the DMA process is performed. In the case of an accelerator, as would be expected, frequent DMA processes are required.

FIG. 6B shows a schematic representation of the steps in a scatter/gather process according to an embodiment of the invention. In this case, once a scatter/gather list has been created, at step 37 a cache list is created which includes all the pointers that are used in the DMA process. The pages in main memory are kept locked. Then, for subsequent DMA transfers the cache list is checked for a transfer with the same address/size. If the transfer hits the cache, i.e. there is an entry in the cache that corresponds to the transfer request, then it is possible to skip directly to the actual DMA transfer (the dotted path in FIG. 6B). If there is a cache miss, i.e. there is no entry in the cache that corresponds to the transfer request, then the process proceeds as in FIG. 6A.

Thus, with reference to FIG. 6B, at step 40, a user starts a DMA process. Next, at step 42 before the step of locking pages and a check is made of the stored cached scatter gather list. If there is a hit, i.e. indicating a request for repeated transfer of a data-set stored in the same location then, the DMA is simply performed. If there is a miss, then the steps 34 to 38 are repeated. The embodiment of the invention is based on the recognition that if a process is repeatedly performing a to or from the same locations in main memory the software overhead of set-up can be avoided. The need to recalculate the scatter/gather pointer lists is obviated in such cases. This significantly reduces the software overhead associated with a scatter/gather DMA process.

In use, upon receipt of a first DMA data transfer request at the accelerator a list of the memory locations of requested data is generated in the accelerator. The generated list is then copied to local memory, e.g. to a local cache. The locally stored list can then be used as a look up table for future DMA requests. What this means that if a subsequent DMA request is in respect of data with the same address and size, then the already generated cached list can be used to execute the DMA transfer. There is no need to repeat the process of generating the scatter/gather list. The generation of the scatter/gather list can be software and processing intensive so a significant efficiency improvement can be made.

As explained above, a further problem arises where it is desired to minimise the total compute time for iteration, including data transfer time, accelerator compute time and CPU compute time. In some situations a compute operation will require, as well operation of the accelerator, also operation of the host CPU. Where there is cross-dependency, i.e. the accelerator and the input data for the next iteration on the accelerator is dependent upon the CPU compute, the CPU time can provide a significant bottleneck and detrimental factor to speedup of the accelerator.

Figure 7:
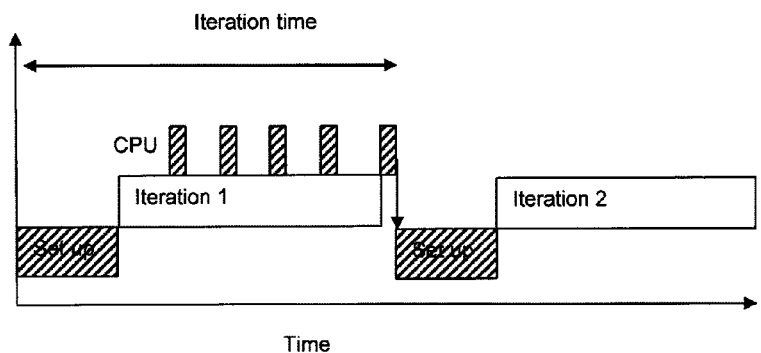
FIG. 7 shows a schematic time progression of a compute process using an embodiment of the invention.

FIG. 7 shows a schematic representation of the time taken for a compute process that uses both an accelerator and also a host CPU. As explained above, in many such cases the total time taken for a single iteration is the sum of the set-up time, the time for the accelerator to do its processing and then the time taken for the host processor to do its processing. As can be seen in FIG. 7, in this example, the processing of the CPU is split up into discrete blocks that are interspersed with the accelerator processing. Thus the accelerator and the host CPU operate in parallel as opposed to in a strictly series manner.

One way this can be achieved is by the setting of milestones within the accelerator process such that when a certain part of the processing has been done by the accelerator the values can be returned to the host CPU which can then do the corresponding part of its processing. This way, instead of waiting for an entire data-set to be processed by the accelerator before the CPU can operate, the host CPU can work in parallel with the accelerator. In effect this may be thought of as breaking the data-set into smaller parts with the use of appropriate milestones which means that when the final part of accelerator processing has been performed, the processing then required of the main computer CPU is significantly less.

Thus, whereas in known systems, the CPU must wait until the data transfer is complete. In the present system, the CPU compute is split into chunks. Each chunk of CPU compute is started when the required data is available, in parallel with the rest of the data transfer.

Figure 7A:
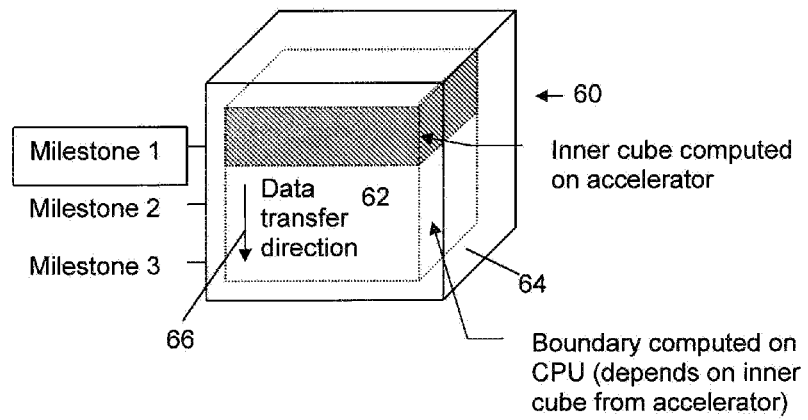
FIG. 7A shows a schematic representation of a three-dimensional volume.
Figure 7A:
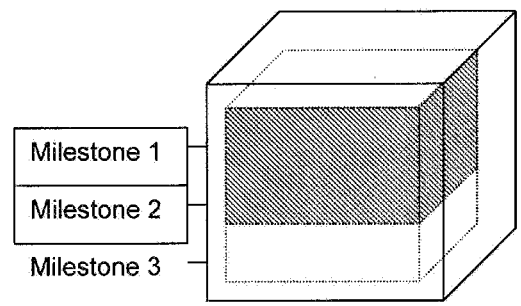

FIG. 7A shows a schematic representation of a three-dimensional volume on which is to be performed a 3D convolution by the accelerator. The volume represent a three-dimensional array of values and may, for example, comprise the results of a three-dimensional seismic survey as described above. The volume 60 may be thought of as being made up of an inner volume 62 and an outer "case" 64. The outer case 64 includes all the components of the volume that are at the boundary of the volume 60. In other words if each element of the volume 60 is itself cuboid, the "boundary elements" are those that share a surface with the surface of the volume 60 as a whole.

The data transfer direction 66 indicates the direction that data is transferred to the accelerator from the host computer 1. The inner cube 62 contains the values that are computed on the accelerator. The boundary case 64 contains the values that are computed on the host computer CPU 4. In this example, the boundary computations are performed on the CPU and the inner cube computations are performed on the accelerator. Conventionally, to perform the boundary computations it would be necessary to wait until the data transfer of the inner cube 62 to the accelerator is complete.

However, as can be seen, once the data transfer of the inner cube reaches the milestone "Milestone 1", the processor has sufficient data to perform the boundary computations for the first region of the volume 60. Thus, in effect, the CPU compute operation is split into chunks and each chunk of the CPU computation is started when the required data is available, in parallel with the rest of the data transfer. This means that by the time the data transfer of the inner cube is completed, i.e. reaches Milestone 3 in FIG. 7A the boundary computations up to the point "Milestone 2" have already been performed. There is therefore a relatively smaller amount of computation to be done at that stage by the CPU to complete the 3D convolution.

Figure 8:
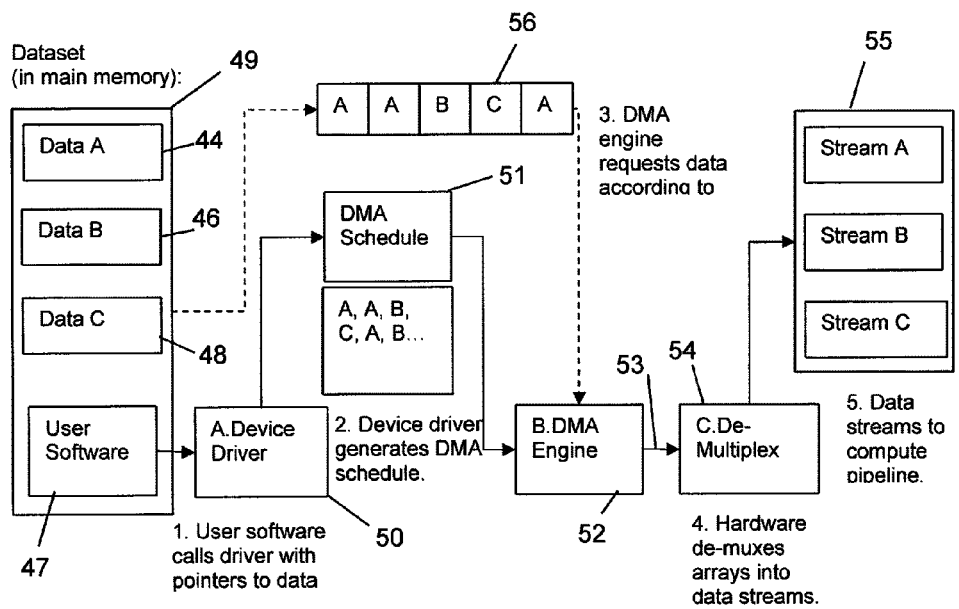
FIG. 8 shows a detailed schematic representation of the data flow path using an accelerator according to an embodiment of the invention; and, FIG. 9 shows a schematic representation of data pages of a data transfer.

FIG. 8 shows a detailed schematic representation of the data flow path using an accelerator according to an embodiment of the invention.

One suitable accelerator for carrying out the process improvements described above will now be described in detail. In a particular preferred embodiment, the accelerator typically includes three components:

1. Software device driver.
2. Hardware DMA engine.
3. Hardware de-multiplexer

FIG. 8 shows the detailed operation of these components.

As can be seen, in this specific example, data is being transferred from three data arrays Data A 44, Data B 46 and Data C 48 for processing by the accelerator. The data arrays Data A 44, Data B 46 and Data C 48 are stored in main, i.e. host, memory 49. A device driver 50 is provided which might typically be implemented in software as part of the accelerator. The device driver 50 serves to generate an interleaved DMA schedule 51 of data which is used to produce one or more data streams 55 to be sent to the hardware, e.g. the FPGA, of the accelerator for processing. In the transfer of data a single interleaved or "generated" stream of data 56 is transferred from the main memory 49 to the accelerator. Later on in the operation and for the accelerator compute process (es), the stream is split up into component streams in dependence on the array from which each individual data element is retrieved.

A hardware DMA engine 52 is provided to perform interleaved DMA requests from the arrays Data A 44, Data B 46 and Data C 48 in main memory 49. The DMA engine 52 is coupled either directly or via some intermediate structure to the main memory 49 such that upon receipt of and in dependence on the DMA schedule 51, it is able to perform the data transfer 56 of data from the arrays 44, 46 and 48 in the main memory. A de-multiplexer 54 is arranged to receive a multiplexed "interleaved" data stream 53 from the hardware DMA engine 52.

In use, when a DMA process is to occur, user software 47 calls the device driver with pointers to data arrays. Thus, the user software on the host informs the accelerator as to the data that is to be the subject of the DMA transfer. The user software calls the device driver (using a system call) with pointers to one or more of the arrays in main memory. Each array has an associated byte offset and size. The offset may be used such that buffers for one or more of the arrays 44, 46 and 48 can be dispensed with further downstream as explained above with reference to FIG. 5. The offset is the point in the overall DMA transfer that the transfer of this array should start. In other words, the offset is the point in the overall DMA transfer (the interleaved stream) that a given array corresponding to a component stream starts.

The size is the amount of data to transfer.

As shown in FIG. 8, multiple arrays are interleaved for the purpose of DMA transfer using a single channel. The single channel represented schematically by the sequence 56 of data pages is made up of data from each of the arrays 44, 46 and 48 in the main memory. An offset is used for one or more of the arrays which is the position in the interleaved data sequence 56 of the first page of that array.

For example, assume there are three arrays (A, B and C) and that they are interleaved. Assume also for the sake of this particular example, that each page of each of the arrays A/B/C is 100 bytes. If the offsets of A, B, C are all zero, they can be interleaved A, B, C, A, B, C, A, B, C and so on. Suppose that an offset of B=200 and an offset for C=400. The data transferred in the lead stream (A) must be >200 before any pages of B are transferred and >400 before any pages of C are transferred. So A, A, B, A, B, A, B, C, A, B, C is now a valid interleave. To explain why it is valid, consider the amount of the lead stream transferred at each point:

A(100),A(200),B,A(300),B,A(400),B,C,A,B,C.

The motivation for offsetting is to send data to the accelerator just as it is required, to reduce the amount of buffering needed on the accelerator. The nature of computations such as 3D convolution is that they require the first item of each array at different times. In the example above, without the use of buffering to perform the same calculation the additional buffering requirement would have been 100 bytes for B and 300 bytes for C. So that the interleaved data stream can still be generated in the same way as previously the "vacant" slots that would have been used for the first entry from B and the first 3 entries for C are stuffed with zeroes, or other such dummy data, on the accelerator. Previously, these slots would also have been "vacant" in that the data from B and C would not have been sent until it was needed, but the zeroes, or other such dummy data, would have been transferred over the bus to the accelerator. This would use up the resource of bus bandwidth. The present system enables both a reduction in the buffering on the accelerator without increasing the bandwidth requirement on the system bus.

Preferably, the target computer or host has a virtual memory system, so that these arrays are broken into pages and distributed about physical memory in a non-contiguous fashion. A typical page size is 4 Kbytes. The host operating system performs demand paging, swapping unused pages out to a disk.

Next, the device driver 50 locates the pages associated with the user array(s) that are to be the subject of the DMA and locks them in physical memory so that the operating system cannot swap them out.

Next, the device driver 50 generates a DMA schedule 51. The device driver 50 generates a DMA schedule 51 for the user arrays. The input preferably includes the offset, size and list of pages for each array. The output schedule is a set of DMA descriptors. Each descriptor is a list of page addresses with a target stream id. A descriptor has associated first size (size of the first page transfer), last size (size of the last page transfer) and number of valid entries (up to 512).

Figure 9:
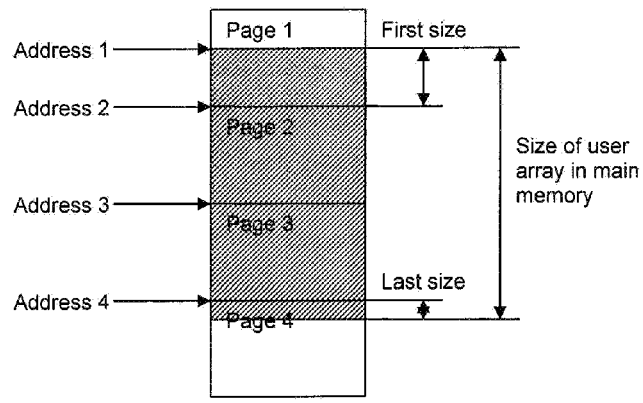

The user array is stored in physical memory as a partial page at the start, N whole pages and finally a partial page at the end. The first and last sizes are the size of the partial pages at the start/end. The N intermediate pages are all transfers of page size (a constant). A number of pages, address of each page and size of the first/last pages is sufficient information to transfer any array in main memory. This is shown schematically in FIG. 9.

Table 1 below shows a schematic representation of a descriptor. Pages other than the first and the last are implicitly a full page in size (4 Kbytes). When using overlapping, the driver restricts the size of the descriptors (number of pages) to a user set 'DMA granularity' to control the maximum data size transferred before the driver unblocks user software.

TABLE 1

|     | Address    | Stream id |
| --- | ---------- | --------- |
| 0   | 0x00001E00 | 0         |
| 1   | 0x00002000 | 0         |
| 2   | 0x00003000 | 0         |
| •   |            | 1         |
| •   |            | 0         |
| 511 | 0x0001F000 | 1         |

```
lead_stream = <pick first stream with offset = 0>
lead_stream_pos = 0
while(streams_done < num_streams) {
    for (s in steams)
```

-continued

```
        if (s->offset < lead_stream_pos) {
            make_descriptor_entry(s->page_address[s->pos],
                    s->page_size[s->pos], s->id);
            if (s == lead_stream)
                load_stream_pos += s->page_size[s->pos];
            s->pos++;
            if (s->pos >= s->total_number_of_pages)
                { streams_done++; s->pos = -1}
        }
    }
}
```

The above pseudo-code is an example of an Algorithm for generating DMA descriptor entries from a set of streams, each with a list of pages, an offset and a size. The algorithm serves to compute DMA descriptor entries by interleaving pages from all data streams 44, 46 and 48.

First, the algorithm selects a 'lead stream', which is any stream with zero offset. Next, the algorithm generates descriptor entries in a round robin fashion for all streams with an offset greater than or equal to the current lead stream position. If all streams have zero offset, the streams are interleaved from the start. If a stream has non-zero offset, several pages of the other streams will be interleaved before the offset stream is included in the schedule.

Once the DMA schedule 51 has been generated, the DMA engine 52 requests data according to the schedule. Thus, as shown in FIG. 8, the DMA schedule contains the entries (schematically shown) "AABCAB". The data 56 as requested and obtained by the engine from the main memory is as specified in the schedule 51. Thus, the schedule is effectively a list that the DMA engine 52 uses to select data for transfer.

The DMA engine 52 traverses the descriptor list 51 and fetches/sends each page in the list from/to main memory 49. Preferably, the DMA engine 52 communicates the stream id of the current page to the hardware de-multiplexer 54 so that the de-multiplexer is able to place the page in the correct stream. After each descriptor, the DMA engine 52 sends an interrupt to the host. The driver uses the interrupts to calculate the position in the stream and unblock a user application that is overlapped.

In greater detail, the user gives the device driver 50 a 'hint' of how often (for how much transferred data) a milestone will be set. The device driver 50 then restricts the size of the scatter/gather lists (above) to equal this size, so that the CPU is interrupted at that interval. The size of the scatter/gather list determines the amount of data transferred autonomously by DMA without interrupting the software. The driver then maintains the milestone by waiting for the appropriate number of interrupts from software. Alternatively, the milestones could be managed entirely by the DMA engine 52. By managing the milestones in the device driver 50, the hardware requirements for this function can be minimised.

One way in which the milestones might be set is exemplified by the pseudocode as follows. The user software operates in a loop:

```
For (x=0; x<size; x+= block size) {
    Set milestone at point x
    Wait for milestone
    Process data up to point x}
```

Initially a range 0<x<size is specified. A milestone is set at the end of the range, i.e. at x=size. The accelerator executes the steps of its algorithm, i.e. processes the data, until it reaches the milestone x. The CPU depends on the calculations from the accelerator up to the value x to be able to compute the boundary conditions up to x. Therefore, once the milestone x is reached, the CPU has enough data to compute the boundary conditions up to the first milestone. This means that when the 3rd milestone is reached the boundary conditions up to the second milestone will have already been calculated.

Last, the hardware de-multiplexes the arrays into data streams for processing by the accelerator. The hardware demultiplexer receives/sends data from/to the appropriate component stream as indicated by the current stream id from the DMA engine 52.

In practice the accelerator including the features discussed herein can be provided as an FPGA device or an ASIC or any other suitable hardware component. In one embodiment, the accelerator is provided as part of a PCI card or any other appropriate insertable means for connection to or arrangement in a host. In an embodiment the host and the accelerator can be provided as part of the same integrated unit. In other embodiments, the accelerator is a separate component that can be connected or disconnected to the host as desired or required. As will be understood, the use of FPGAs enables the precise computation of the accelerator to be customized for a specific application.

Embodiments of the invention have been described with particular reference to the examples illustrated. However, it will be appreciated that variations and modifications may be made to the examples described within the scope of the invention. For example different forms of hardware and/or software may be used to implement the accelerator as appropriate. It will also be appreciated that the invention may be provided as a computer program or a set of instructions for programming programmable logic on a computer readable medium for storing and use on a computer or computer system.

The invention provides a method of transferring data from a data array within a main memory of a computer to an accelerator for processing, the method comprising; at the accelerator, requesting data from the main memory and generating a data stream between the main memory and the accelerator, the generated data stream including data from the data array; and, using an offset to determine the scheduling of array elements within the generated data stream.

The invention claimed is:

1. A method of transferring data from a data array within a main memory of a computer to an accelerator for processing, the method comprising:
   at the accelerator, requesting data from the main memory and generating a data stream between the main memory and the accelerator, the generated data stream including data from the data array; and
   using an offset to determine the scheduling of array elements within the generated data stream, in which, within the main memory there are two or more data arrays and wherein at the accelerator, the data stream generated is an interleaved data stream including data from each of the two or more data arrays in the main memory and wherein the offset for each array is used to determine the starting position for the first element of that data array within the interleaved data stream from each of the two or more data arrays in the main memory,
   wherein the accelerator is arranged to execute a convolution of data from the two or more arrays, wherein the first element from each of the arrays used by the accelerator in the convolution is transferred at a time that is determined by the corresponding offset.

2. A method according to claim 1, in which the offset for at least one of the arrays is zero and for at least one other of the arrays is non-zero.

3. A method according to claim 1, in which data is requested by a device driver of the accelerator.

4. A method according to claim 1, in which the accelerator comprises a Direct Memory Access (DMA) engine arranged to access the data in the main memory, wherein the DMA engine is arranged to access the data in main memory, the ordering of access being dependent on the one or more offsets.

5. A method according to claim 3, comprising the device driver generating a DMA schedule of data pages to be transferred via the DMA engine.

6. A method according to claim 1, in which data stored locally to the accelerator is used together with the data from the data array in main memory in the execution of a function or process.

7. An accelerator for connection to a main computer having a central processing unit and main computer memory including at least one data array, the accelerator including logic to execute a computation process and being arranged to generate a data stream including data from the data array within the main memory, the accelerator comprising:
   a logic device arranged to be programmed to execute a desired computation process; and
   a device driver arranged to control the request of data from a main memory of a computer to which, in use, the accelerator is connected, the driver being arranged to:
   (a) use an offset to determine the scheduling of array elements within the generated data stream in which, within the main memory there are two or more data arrays and wherein at the accelerator, the data stream generated is an interleaved data stream including data from each of the two or more data arrays in the main memory and wherein the offset for each array is used to determine the starting position for the first element of that data array within the interleaved data stream from each of the two or more data arrays in the main memory,
   wherein the accelerator is arranged to execute a convolution of data from the two or more arrays, wherein the first element from each of the arrays used by the accelerator in the convolution is transferred at a time that is determined by the corresponding offset.

8. An accelerator according to claim 7, wherein the device driver is implemented in software.

9. An accelerator according to claim 7, comprising a hardware Direct Memory Access (DMA) engine.

10. An accelerator according to claim 7, comprising a hardware de-multiplexer.

11. An accelerator according to claim 7, arranged to execute the method of claim 1.

12. A computer system, including:
   a computer having main memory and a central processing unit; and
   an accelerator according to claim 7.

13. A computer system according to claim 12, in which the logic is a programmable logic device, such as a field programmable gate array.

14. A computer program, stored on a non-transitory computer readable medium, which when run on a programmable logic device provided on an accelerator causes the accelerator to execute the method of claim 1.

* * * * *